United States Patent
McCormick et al.

[11] 3,757,235
[45] Sept. 4, 1973

[54] SIGNAL CANCELLATION

[75] Inventors: Karl McCormick, Channelview; Thorwald John Tvedt, Houston, both of Tex.

[73] Assignee: Shell Oil Company, Houston, Tex.

[22] Filed: June 7, 1972

[21] Appl. No.: 260,614

[52] U.S. Cl. .................................. 328/166, 328/165
[51] Int. Cl. .............................................. H03h 1/04
[58] Field of Search ............................. 328/165, 166

[56] References Cited
UNITED STATES PATENTS

| | | | |
|---|---|---|---|
| 2,996,677 | 8/1961 | Marcy | 328/166 X |
| 3,172,046 | 3/1965 | Paufve et al. | 328/166 |
| 3,289,089 | 11/1966 | Linder | 328/165 X |
| 3,492,591 | 1/1970 | Shapiro | 328/165 X |
| 3,577,009 | 5/1971 | Hofmeister | 328/166 X |

*Primary Examiner*—John S. Heyman
*Attorney*—Theodore E. Bieber et al.

[57] ABSTRACT

A system for cancelling the any frequency power line signal picked up by the electronics of a seismic exploration system, including means for sampling the power line signal, splitting the sample into four quadrant signals, automatically picking the quadrant signal closest to being 180° out of phase with the actual signal to be canceled, automatic means for precisely adjusting the phase relationship to be 180° out of phase and means for automatically adjusting the amplitude of the sampling signal until it exactly cancels the unwanted signal.

8 Claims, 4 Drawing Figures

SIGNAL CANCELLATION

BACKGROUND OF THE INVENTION

The present invention relates to a system for automatically cancelling unwanted signals in electronic circuitry. More particularly it relates to a system for automatically cancelling the unwanted signal picked up by the electronics of a seismic exploration system.

A method commonly employed for prospecting for oil or other mineral deposits is that known as seismic prospecting wherein an explosive charge is detonated in a shot-hole and the motion of the earth from the resulting seismic disturbance is detected at a number of points spread out in a desired pattern from the shothole, sensitive pick-ups or geophones being employed to translate the detected motion into electrical impulses which after suitable amplification are recorded. Conventionally, after suitable data processing, a seismograph record is obtained by means of a number of moving coil galvonometers each one of which has a mirror attached thereto, the mirrors being arranged in such a relation to a source of light and a moving strip of sensitized film that there will be recorded on the film a plurality of wave forms or traces representative of the seismic waves that have been picked up by the individual geophones.

One of the difficulties encountered in recording seismic data is the unwanted electrical signals picked up from nearby sources of electrical power. Frequently seismic exploration is carried out close to long distance electrical power transmission lines and in areas where lines supplying power to farms, houses and factories are common. The cables stretching from the various geophones to the amplification truck act as antennas, and so frequently very substantial extraneous signals are picked up. Indeed these signals are frequently much stronger than the seismic signals that may on occasion be only a few microvolts. The problem then is to eliminate the extraneous signals picked up in the seismic exploration electronics while retaining the seismic signals.

At present this problem is attacked by manually balancing out the unwanted power line signal (almost always 60 Hz) ahead of the input stage to the amplifier and also running the signals through a power line frequency notch filter. The notch filter removes power line frequency noise, but also removes power line frequency reflections. Also, this is a very time-consuming and therefore costly procedure and loss of time will increase alarmingly as the number of channels are increased. The phase relationships of power line frequency noise in a particular line are stable for only a few minutes and by the time all of the channels have been balanced by hand, the first channels to be balanced are already unbalanced.

Therefore, it is an object of this invention to provide an automatic cancellation scheme that requires a minimum amount of time and therefore may be done immediately before the firing of a shot. A further object is to provide cancellation of power frequency noise without removing power frequency signals or causing phase shift of desired signals. It is another object of this invention to accomplish the cancellation in the input circuit of the amplifier thereby eliminating the unwanted signal before recording so the dynamic range of the recording system is available for recording the desired signal. Another object of this invention is to provide a cancellation system that does not introduce undesirable effects such as unwanted noise or loading. Finally, it is an object of this invention to provide a system that is neither bulky nor consumes undue amounts of power.

SUMMARY OF THE INVENTION

These and other objects of the invention are achieved by a system that comprises a means for detecting a sample signal from an unused pair of conductors in the seismic system. The reference signal is then split into four quadrant signals. The output of each channel is compared in phase with the reference, and the channel output signal's phase quadrant is determined. The two signals bounding a particular quadrant are selected and supplied to a phase shifting circuit. The amplitude and phase of the reference signal are then adjusted until the amplitude is precisely the same as that of the unwanted signal and the phase is precisely 180°. This signal is then used to cancel the unwanted signal.

DESCRIPTION OF THE PREFERRED EMBODIMENT

Figure 1:
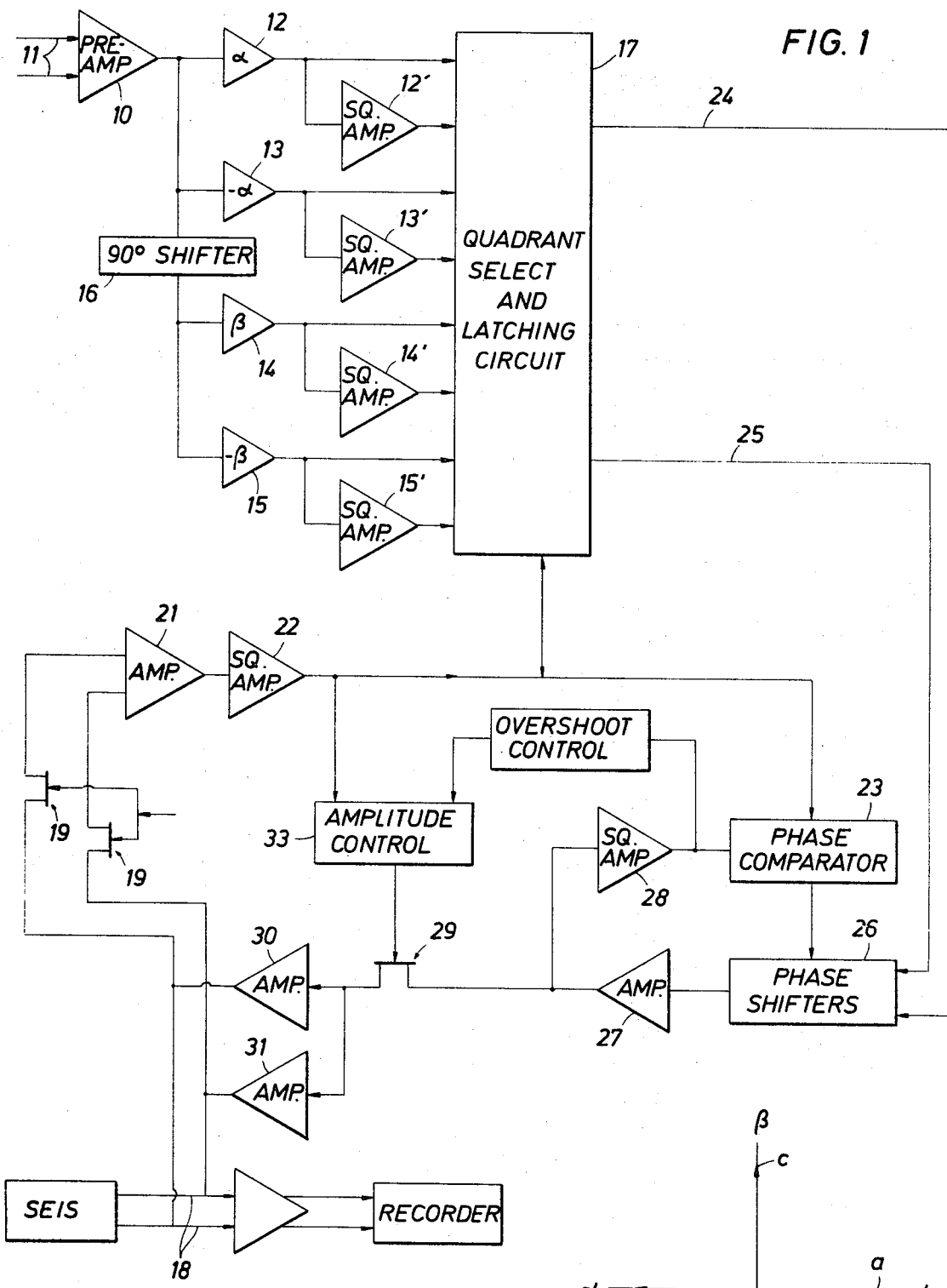
FIG. 1 is a block diagram showing the organization of the present invention.

Referring now to FIG. 1 a preamplifier 10 detects and amplifies a reference signal from an input cable 11 which is disposed in the vicinity of some portion of the seismic exploration electronics. The amplified signal is then divided into four signals separated substantially 90° in phase from each other. This is achieved by a phase generating circuit formed by operational amplifiers 12, 13, 14, and 15 and 90° phase shift network 16. The amplifiers 13 and 15 invert the signal and supply negative signals corresponding to signals supplied by amplifiers 12 and 14. Squaring amplifiers 12' – 15' supply a square-wave output having precisely the same frequency and phase as their inputs. Thus, the four outputs of amplifiers 12' – 15' are square-waves having the same frequency and separated in phase each by 90°. All of these outputs, both from amplifiers 12 – 15 and from 12' – 15', are applied to the input of a latching circuit 17 as described below. As an aid to conceptualizing the present invention, the outputs of each of the amplifiers 12 – 15 may be thought of as a rotating vector.

Figure 2:
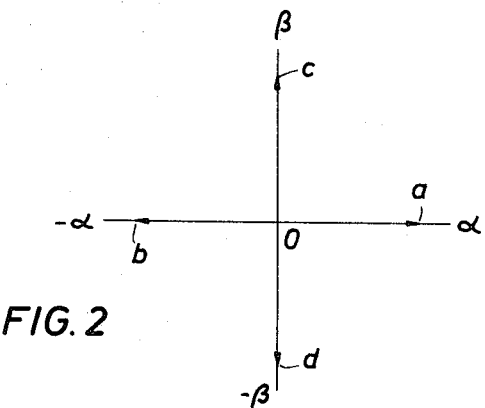
FIG. 2 is a vector chart illustrating the concept of the present invention.

Referring now to FIG. 2, the output of amplifier 12 is represented by a vector originating at the origin and moving outwardly to the right along the horizontal axis and terminating at point $a$. The output of amplifier 13 may be thought of as a vector originating at the origin and extending to the left to point $b$. The output of amplifier 14 may be though of as vector originating at the origin and extending vertically upward to point $c$. Finally, the output of amplifier 15 may be thought of as a vector originating at the origin and extending downward to point $d$. The outputs of amplifiers 12' – 15' bear the same phase relationships as seen in FIG. 2, but are square-waves instead of the waveshape of the reference signal from the cable 11.

The function of quadrant select and latching circuit 17 is to detect at any particular moment the phase relationship existing between the reference signal and the unwanted signal coming in on any of the channel lines 18. Lines 18 represent the differential output of any seisometer. The unwanted signal is detected through a field-effect transistor (FET) switches 19 that are turned on or off by a switch, not shown. The unwanted signal passed through FET switches 19 is amplified by amplifier 21, squared by squaring amplifier 22 and supplied to one input of a phase comparator circuit 23. The output of amplifier 22 is also supplied to quadrant select and latching circuit 17. Quadrant select and latching circuit 17 determines which quadrant the output of squaring amplifier 22 falls into and latches the two inputs that border the quadrant onto output lines 24 and 25. For example, if the output of squaring amplifier 22 fell into the second quadrant, the $\alpha$ and $\beta$, amplifiers 13 and 14 would be latched to output lines 24 and 25, respectively. In this way one of the signals on lines 24 and 25 would lead the signal from squaring amplifier 22 and the other signal on lines 24 or 25 would lag. Outputs 24 and 25 are mixed in a mixing or phase shifter circuit 26 into a signal output signal having a phase that may be varied over a range of 90°. The output of phase shifter 26 is amplified in amplifier 27 and then supplied to a squaring amplifier 28. The output of squaring amplifier 28 is compared in phase comparator circuit 23 with the output of squaring amplifier 22 and an error signal is supplied to phase shifter 26 so long as there is a difference in phase of other than 180°. The output of amplifier 27 is also supplied through field-effect transistor 29 to output amplifiers 30 and 31. The amplitude of the output signal supplied by amplifiers 30 and 31 are controlled by the feedback loop comprising amplifiers 21 and 22, an amplitude control circuit 33, and a field effect transistor 29. The signal on the gate of FET 29 will be varied by amplitude control circuit 33 until the output of amplifiers 30 and 31 is precisely equal to an amplitude and opposite in phase to the unwanted signal appearing on input 18.

Figure 3:
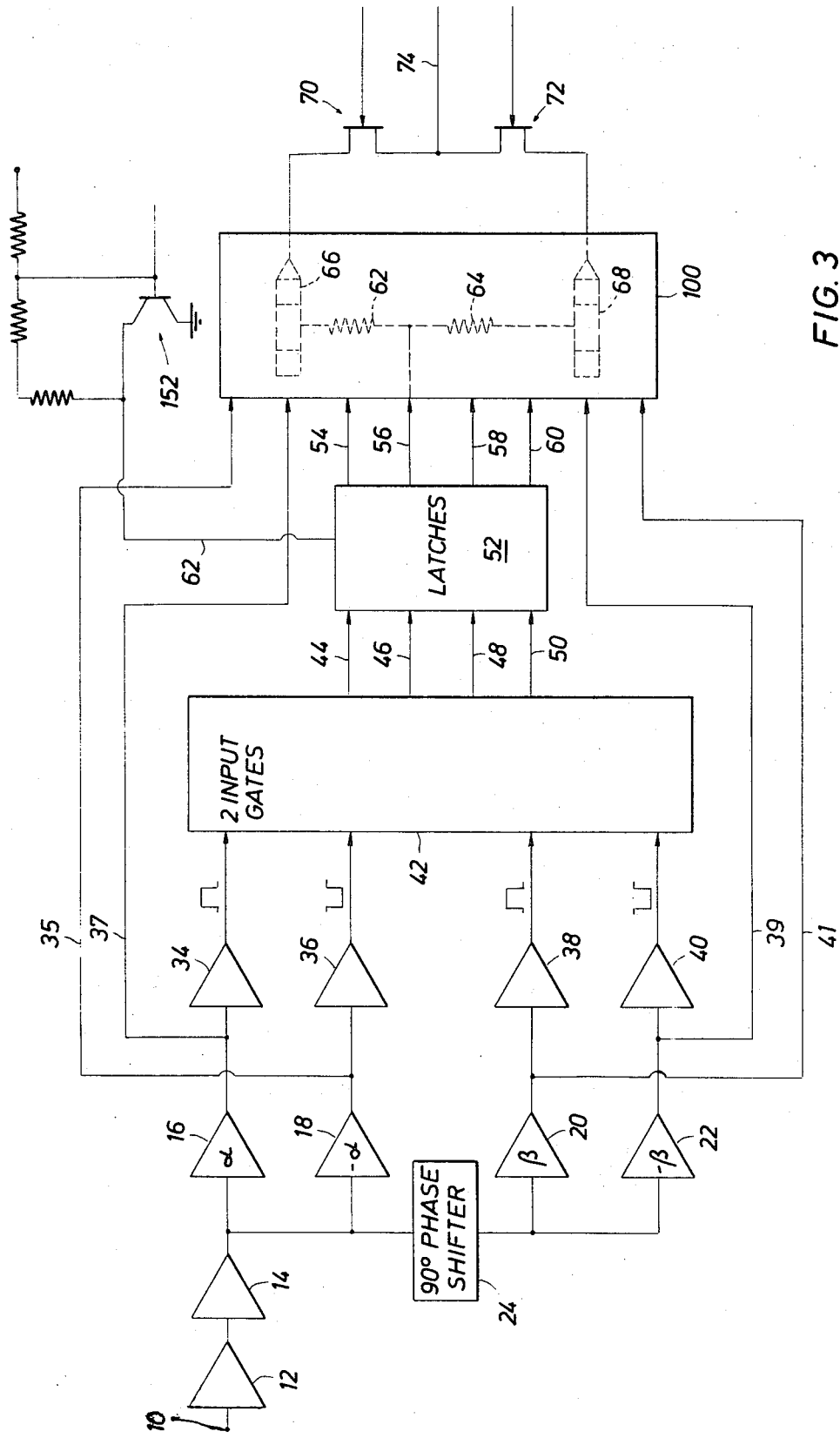
FIG. 3 is a block diagram of the quadrant selecting circuit.

Referring now to FIG. 3 a reference signal is preferably obtained from an unused pair of conductors in the seismometer cable and is supplied to input 10 of preamplifier 12. Preamplifier 12 is a conventional operational amplifier that functionally operates to raise the input signal to a level that can be conveniently handled by automatic gain control amplifier 14. Automatic gain control amplifier 14 is also conventional and functionally provides a constant amplitude output signal. Amplifiers 16, 18, 20 and 22 are conventional operational amplifiers that perform a phase shifting and buffering function. The output of amplifier 16 is the same as the output of amplifier 14 but at a higher current level. This will be called the $\alpha$ signal. The output of amplifier 18 is 180° out of phase with the output of amplifier 14 and will be called the $\alpha$ signal. Phase shifter network 24, consisting of a conventional RC network, shifts the output of amplifier 14 by 90° to form the $\beta$ signal on the output of amplifier 20 and the $\beta$ on the output of amplifier 22. The outputs of amplifiers 16, 18, 20 and 22 are supplied directly via leads 35, 37, 39 and 41 to the input of transistor switching network 100. The outputs of amplifier 16, 18, 20 and 22 are also supplied respectively to square-wave generating amplifiers 34, 36, 38 and 40. Amplifiers 34-40 are conventional operational amplifiers that supply a square-wave output of the same phase and frequency as their input. This is achieved merely by heavily saturating the amplifier so that it clips almost immediately. Amplifiers 34-40 also provide a conventional buffering function.

The outputs of amplifiers 34-40 are supplied to gating circuits 42 which comprise a set of four, 2-input gates. The output on lead 44 is high when both $\alpha$ and $\beta$ are positive, the output on lead 46 is high when $\alpha$ is negative and $\beta$ is positive, the output on lead 48 is high when both $\alpha$ and $\beta$ are negative and the output on lead 50 is high when $\alpha$ is positive and $\beta$ is negative.

The outputs 44-50 are supplied to latches 52, a commercial device manufactured by Motorola, Model MC867P. Latches 52 have four outputs, 54, 56, 58 and 60 along with an input lead 62 over which clock pulses are supplied. The circuit performs the following function:

Each particular input is associated with a particular output. For example, input 44 might be associated with output 54; input 46 associated with output 56; and so on. When a clock pulse is received, the output associated with the input that is high at that particular moment is latched on and remains on until the next clock pulse at which time the operation is repeated. For example, if input 48 is high at the moment the clock pulse is received, output 58 will be latched high and will remain high until the next clock pulse. At that time if input 48 is still high, output 58 will remain high also. However, if, for example, input 44 is high when the second clock arrives, output 54 will be latched on and output 58 will be off.

Figure 4:
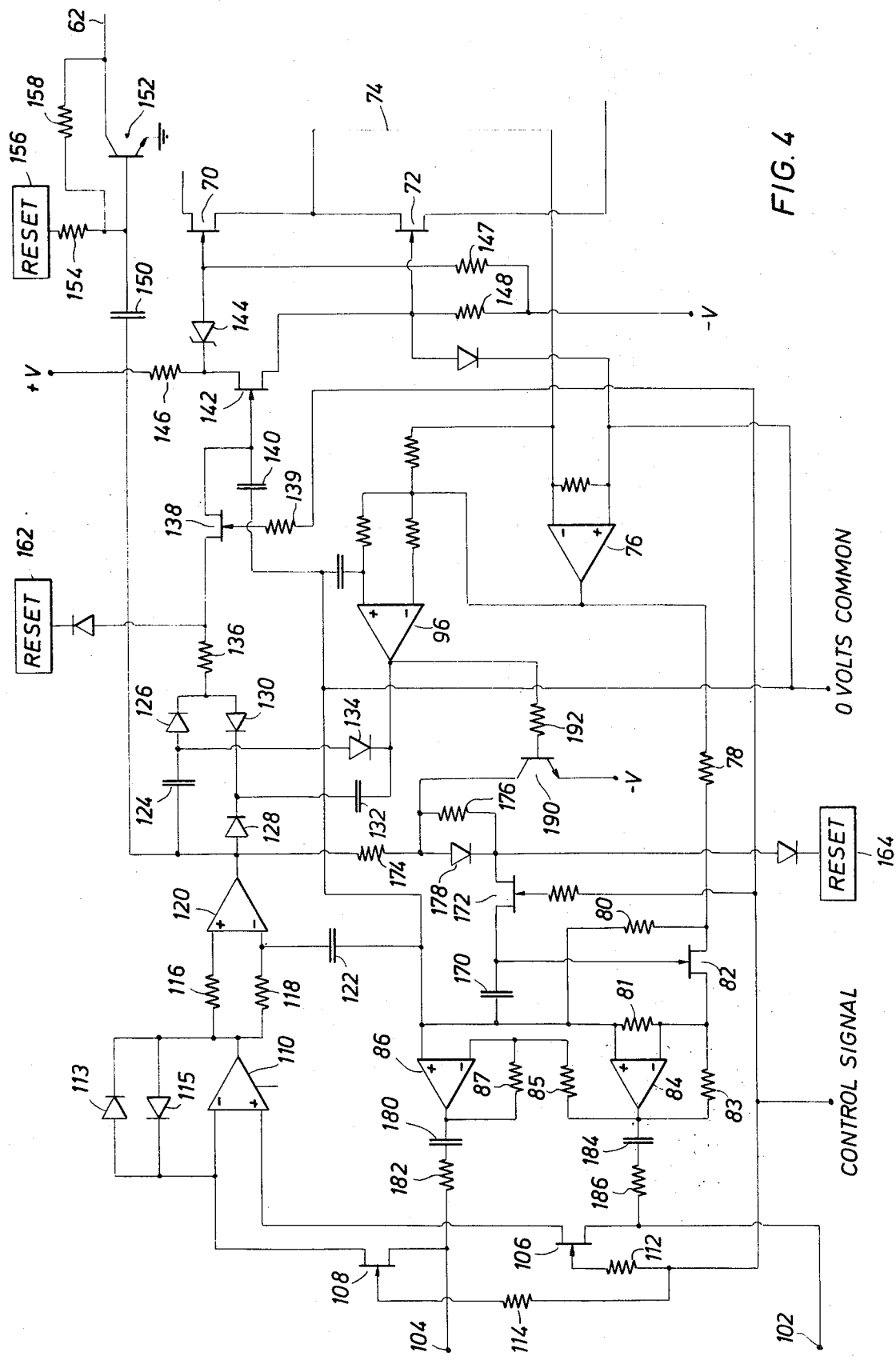
FIG. 4 is a detailed circuit diagram of one embodiment of the present invention.

The outputs of the latching circuit 52 are supplied to switching network 100 along with the outputs of the $\alpha$ and $\beta$ generators 16-22. Switching network 100 is no more than a set of transistor switches, two transistors for each input 54-60, connected in the same manner as that illustrated by the dotted lines for input 56. The connections associated with one output only will be shown for the sake of simplicity. Output 56 is connected through resistors 62 and 64 to the bases of transistors 66 and 68. The collectors (in this case npn transistors are being used; it would be emitters if pnp's were being used) of transistors 66 and 68 are connected to the outputs of amplifiers 16 and 22. When output 56 is high, transistors 66 and 68 are turned on, and the fourth quadrant has been selected (the $\alpha$ and $\beta$ signals denote the 4th quadrant). A similar set of resistors and transistors are connected to outputs 54, 58 and 60 and are all located within transistor switching array 100. The emitter of transistor 66 is connected to field-effect transistor (FET) 70 while the emitter of transistor 68 is connected to FET 72. Lead 74 is connected between the common point between FET's 70 and 72 and the negative input of operational amplifier 76 (shown in FIG. 4), a conventional operational amplifier performing a conventional amplification function.

The output of operational amplifier 76 is supplied through a resistor-divider network consisting of resistors 78 and 80 to FET 82. From there the output of amplifier 76 is supplied to both operational amplifiers 84 and 86 which are configured so that their output is an amplified differential replica of the output of operational amplifier 76.

The output lines from a seismometer, generally a difference signal across two output lines, are connected to inputs 102 and 104. The signals on input 102 and 104 are supplied via field-effect transistors 106 and 108

(corresponding to FET's/19 in FIG. 1) to the input of operational amplifier 110. FET gates 106 and 108 are open or closed by a control signal supplied via resistors 112 and 114. Diodes 113 and 115 in the feedback loop of amplifier 110 limit the amplifier output to avoid non-linearities due to saturation. The output of amplifier 110 is supplied through resistors 116 and 118 to the input of operational amplifier 120. Amplifier 120 is designed as a clipping amplifier and puts out a square-wave inphase with its sinusoidal input. Resistor 118 and capacitor 122 combine to form the biasing for amplifier 120. This arrangement is necessary since operational amplifier 110 has some finite DC bias that would cause amplifier 120 to clip asymmetrically. Capacitor 122 charges to the mean average value of the DC bias from amplifier 110 and thereby eliminates the possibility of asymmetrical clipping. The output 120 is supplied to the parallel combination of capacitor 124, crystal rectifier 126, crystal rectifiers 128 and 130, and capacitor 132 and crystal rectifer 134. These elements comprise a phase comparator circuit that compares the phase of the output of operational amplifier 120 with the output of operational amplifier 96. As will be recalled, the output of amplifier 96 is a square-wave in phase with the reference signal picked up at input 10. If the signal out of amplifier 120 lags the signal out of amplifier 96, then the output of amplifier 96 will be high when the signal across capacitor 124 goes high. If this is the case, the signal will pass through capacitor 124 and crystal control rectifier 126, and also through resistor 136 and field-effect transistor switch 138, and ultimately end up in capacitor 140. On the other hand, if the output of amplifier 120 is low when the output of amplifier 96 goes low, charge is taken away from capacitor 140 via field-effect transistor switch 138, resistor 136, crystal diode 130, and capacitor 132. When the output of amplifier 120 and 96 are out of phase by precisely 180°, there is no charge transfer either to or from capacitor 140.

The voltage level on capacitor 140 in turn controls the gate of insulated gate field-effect transistor 142. Transistor 142, in turn, determines the degree to which field-effect transistors 70 and 72 will be turned on or off. The gate of field-effect transistor 70 is connected through zener diode 144 to one side of transistor 142 and through 146 to a positive source of voltage. The common node between zener diode 144 and the gate to field-effect transistor 70 is connected through resistor 147 to a negative source of power. The other side of field-effect transistor 142 and the gate of field-effect transistor 72 are connected through resistor 148 to a negative source of voltage.

When capacitor 140 is discharged, field-effect transistor 142 will be off, the gate of field-effect transistor 70 will be at approximately zero volts and on; and, since field-effect transistor 142 is non-conducting, the gate of field-effect transistor 72 will be at minus voltage and turned off. At this stage, the signal on line 74 is supplied completely via field-effect transistor 70. As the charge on capacitor 140 increases, 142 begins to conduct, which in turn gradually lowers the voltage on the gate of field-effect transistor 70 and gradually raises the voltage on the gate of field-effect transistor 72. The effect of this is to gradually introduce more signal via field-effect transistor 72 on to line 74. As this occurs, the phase of the signal on line 74 gradually shifts until the point at which field-effect transistor 70 is completely off and field-effect transistor 72 is completely on, at which time the phase will have shifted 90°. At some point in that 90°-shift, a point will be reached wherein the signal on line 74 is precisely 180° out of phase with a signal coming in on line 102 and 104. At this point, no further charging or discharging of capacitor 140 will occur, and the objective of providing an output signal precisely 180° out of phase with the input signal will have been achieved.

To prevent the charge on the capacitor 140 from leaking back through field-effect transistor 138, the gate of field-effect transistor 138 through resistor 139 is tightly turned off by a control voltage.

The output of operational amplifier 120 is also supplied via capacitor 150 to the base of clock transistor 152. The collector of clock transistor 152 is connected via lead 62 to latching circuit 52, while the emitter of transistor 152 is connected to ground. The common junction between capacitor 150 and the base of transistor 152 is connected via resistor 154 to a reset switch 156. Also, a resistor 158 is provided between collector line 62 and capacitor 150. Resistor 158 is provided for biasing transistor 152 into a normal conducting state. Transistor 152 is normally conducting and is driven off by the negative half of the square-wave coming from operational amplifier 120 via capacitor 150. When transistor 152 is conducting, line 62 will be at a low voltage. When transistor 152 is cut off, line 62 goes high. In this way clock pulses are supplied to latching circuit 52.

To initialize the circuit, the reset button is pushed, at which time reset lines 156, 162, and 164 are each pulled to a minus voltage. This discharges capacitor 170 through field-effect transistor switch 172, capacitor 140 through field-effect transistor switch 138. The reset line is normally positive and supplies a heavy bias to transistor 152 so that the energy being transmitted through capacitor 150 on each negative half cycle will not turn off transistor 152 until the reset button is pushed (i.e., the reset line is connected to a negative voltage).

When the reset button is pushed, capacitor 170 is discharged and operational amplifiers 84 and 86 are turned off. Thus, there is no signal being supplied outwardly onto lines 102 and 104. The signal coming in on lines 102 and 104, amplified by amplifier 110 and squared in amplifier 120 feeds through capacitor 150 into clock transistor 152, causing a clock pulse that in turn actuates latching circuit 52. Clock pulses will continue to be supplied at a power line frequency rate until the reset button is released.

The amplitude control components of the circuit include amplifiers 110 and 120, resistors 174, 176, crystal rectifier 178, field-effect transistor switch 172 and capacitor 170. As mentioned previously, the sinusoidal output of amplifier 76 is supplied via resistor 78 to field-effect transistor 82. Field-effect transistor 82 essentially operates as a variable resistance and the amplitude of the signal passed depends upon the amplitude of the control signal supplied to its gate. This signal is determined by the charge on capacitor 170. At reset, capacitor 170 is negatively charged through reset 164. Consequently field effect transistor 82 is off. During the positive portion of each cycle of the output of amplifier 120 a small increment of charge is passed through resistor 174, crystal rectifier 178 and field-effect transistor 172 to capacitor 170. As the charge on capacitor 170 increases, field-effect transistor 82 is gradually turned on. The signal passing through field-effect transistor switch 82 is supplied to negative input of amplifier 84, and from the output of amplifier 84 through resistor 85 to the negative input of amplifier 86. The outputs of amplifiers 84 and 86 are then transmitted respectively through capacitor 180 and resistor 182 to input 104 and through capacitor 184 and resistor 186 to input 102. Resistors 83 and 87 stabilize and partially determine the gain of amplifiers 84 and 86, respectively. Resistor 81 provides the biasing of amplifier 84 when 82 is off. As the charge on capacitor 170 gradually builds up, the signal passing through field-effect transistor gate 82 gradually increases and ultimately the cancelling power line frequency signal supplied to inputs 102 and 104 gradually increases until the point at which the cancellation signal exactly equals the unwanted pick-up signal. At this point there would be no power line frequency signal detected by amplifier 110 and as a result the incremental charge passed to capacitor 170 will stop.

Occasionally the cancellation signals supplied by amplifiers 84 and 86 actually increases beyond the point where it completely cancels the unwanted signal (this is commonly called "over-shoot"). At this point a positive feedback situation develops and if precautions were not taken, the output signal would grow indefinitely. To avoid this problem transistor 190 is provided having its collector tied to the common node between resistors 174 and 176 and crystal rectifiers 178, its base tied through resistor 192 to the output of amplifier 96 and its emitter connected to a source of negative voltage. Transistor 190 solves the over-shoot problem in the following way. At the point at which the output signals from amplifier 84 and 86 go beyond cancelling the input signal, the phase of the signal supplied to amplifier 110 is abruptly shifted 180°. Consequently, positive half cycle of amplifier 120 coincides with the positive half cycle of amplifier 96. However, when amplifier 96 is positive, transistor 190 is strongly conducting and bleed off any charge transferred from amplifier 120 through resistor 176.

Normally the system is operated to cancel the unwanted signals immediately prior to the production of a seismic disturbance. For example, the system could be operated immediately prior to detonating an explosive charge. As explained above the operation is initiated by closing the control signal and reset switches. The system will then detect a power line frequency signal and generate the required phase signals from the source signals. The system will sample the signal on the geophone leads. This signal will normally consist of stray power line frequency plus random noise. The system then compares the phase of power line frequency geophone signal with the phase of the selected phase signals and produces a compensating signal. The compensating signal has the same amplitude as the geophone signal and is 180° out of phase. The control signal is then opened and the system will continue to supply the compensating signal. Shortly after the control signal is opened the seismic disturbance should be initiated. While a time period will elapse between production of the compensating signal and the recording of the seismic signals it is relatively short. The stray power line signal will not change appreciably during the short delay period.

The present system will cancel the unwanted power line frequency signal but will pass the seismic signals even though they may be of the same frequency as the power line. This result is achieved by generating a compensating signal having the proper phase and amplitude instead of using notch filters. Any signal other than the one canceled by the compensating signal will be passed.

We claim as our invention:

1. A system for automatically cancelling unwanted signals in the electrical circuitry while preserving a wanted signal having the same frequency, comprising:
    means for continuously generating a reference signal having the same frequency and wave form as the unwanted signal;
    means for generating a plurality of phase signals having the same frequency as said reference signal and a phase displaced from each other;
    means for detecting the phase of said unwanted signal;
    means for combining at least the two of said phase signals that are closest to the phase of said unwanted signal to provide a cancellation signal substantially 180° out of phase with said unwanted signal;
    means for adjusting the amplitude of said cancellation signal to be substantially equal to said unwanted signal; and,
    means for supplying said amplitude adjusted cancellation signal to said electrical circuitry whereby said unwanted signal is eliminated therefrom.

2. The system of claim 1 wherein said combining means comprises:
    means for selecting the two phase signals closest in phase to said unwanted signal;
    means for combining said two phase signals in variable proportions to form a cancellation signal;
    means for comparing the phase of said unwanted signal and said phase signals;
    means responsive to the phase difference between said unwanted signal and said phase signals for varying the proportions of said phase signals so that the phase of said cancellation signal is substantially 180° out of phase with said unwanted signal; and
    means responsive to the remainder of said unwanted signal to adjust the amplitude of said cancellation signal so that it substantially equal to that of said unwanted signal.

3. The system of claim 1 wherein said phase signals comprise four signals approximately 90° apart and the phase quadrant into which said unwanted signal falls is detected, said phase quadrant being used to select the two phase signals to be combined to form said cancellation signal.

4. The system of claim 1 wherein said electrical circuitry comprises seismic amplifiers and said unwanted signal comprises stray power line frequencies.

5. The system of claim 1 wherein said plurality of phase signals and said reference signal are converted to square-wave signals having the same phase as the phase and reference signals and the means for detecting the phase of the unwanted signal comprises a phase comparing circuit, said square-wave signals being coupled to said phase comparing circuit; the signal from said phase comparing circuit being used to control the means used for combining the phase signals to produce a cancellation signal.

6. A cancellation system for cancelling stray power line signals in a seismic amplifying system, said cancellation system comprising;
  detecting means disposed to produce a source signal related to the phase and amplitude of the stray power line signal;
  phase generating means for generating a plurality of phase signals from said source signal, each of said source signals being displaced in phase from the adjacent phase signals by equal phase angles;
  a second detecting means coupled to said seismic amplifying system for detecting the unwanted signal;
  first squaring means coupled to said generating means for squaring said phase signals;
  second squaring means coupled to said second detecting means for squaring said unwanted signal;
  phase comparing means, said first and second squaring means being coupled to said phase comparing means;
  mixing means, switch means, said switch means being coupled to said phase comparing circuit and said generating means, said switch means being closed in response to the signal from said phase comparing means to transmit portions of at least two of said phase signals to said mixing means whereby said mixing means produce a signal 180° out of phase with said unwanted signal.

7. The cancellation system of claim 6 wherein said generating means produces four phase signals having substantially 90° phase angles between adjacent phases.

8. The cancellation system of claim 7 wherein said switch means comprise a pair of semi-conductor devices, two adjacent phase signals being coupled to said semi-conductor devices, said semi-conductor devices being responsive to the signal from said phase comparing circuit to conduct to transmit portions of said two adjacent phase signals to said mixing circuit.

* * * * *